United States Patent
Vasqnez et al.

(10) Patent No.: US 7,499,043 B2
(45) Date of Patent: Mar. 3, 2009

(54) SWITCHING OF DISPLAY REFRESH RATES

(75) Inventors: Maximino Vasqnez, Fremont, CA (US); Achintya K. Bhowmik, Milpitas, CA (US); Kristine Karnos, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 11/442,798

(22) Filed: May 30, 2006

(65) Prior Publication Data

US 2007/0279407 A1    Dec. 6, 2007

(51) Int. Cl.
*G06F 3/038* (2006.01)
*G06F 15/00* (2006.01)
*G09G 5/00* (2006.01)
*G06T 1/00* (2006.01)

(52) U.S. Cl. .................. 345/212; 345/211; 345/214; 345/501

(58) Field of Classification Search ......... 345/211–214, 345/501
See application file for complete search history.

(56) References Cited

U.S. PATENT DOCUMENTS

| 7,190,361 | B2 * | 3/2007 | Igarashi et al. | 345/213 |
| 2005/0030306 | A1 * | 2/2005 | Lan et al. | 345/211 |
| 2007/0002036 | A1 * | 1/2007 | Kardach et al. | 345/213 |
| 2007/0146294 | A1 * | 6/2007 | Nurmi et al. | 345/102 |
| 2007/0229487 | A1 * | 10/2007 | Slavenburg et al. | 345/213 |

OTHER PUBLICATIONS

Wyatt, David, "Method and Apparatus for Dynamically Changing Display Refresh Rate", U.S. Appl. No. 11/027,113, filed Dec. 30, 2004.

* cited by examiner

*Primary Examiner*—Chante Harrison
(74) *Attorney, Agent, or Firm*—Caven & Aghevli LLC (57) ABSTRACT

Some embodiments describe techniques that may relate to switching of display refresh rates. In one embodiment, modification of a display refresh rate may be initiated after the last pixel of a portion of a first image frame is driven. Other embodiments are also described.

36 Claims, 5 Drawing Sheets

SWITCHING OF DISPLAY REFRESH RATES

BACKGROUND

The present disclosure generally relates to the field of electronics. More particularly, an embodiment of the invention relates to switching of display refresh rates.

Portable computing devices are gaining popularity, in part, because of their decreasing prices and increasing performance. Another reason for their increasing popularity may be due to the fact that some portable computing devices may be operated at remote locations, e.g., by relying on battery power. As more functionality is integrated into portable computing devices, the need to reduce power consumption becomes increasingly important, for example, to maintain battery power for an extended period of time.

Moreover, some portable computing devices include a liquid crystal display (LCD) or "flat panel" display. An LCD may consume a significant portion of the reserved battery power. To reduce LCD power consumption (and increase battery life), the backlight brightness of an LCD may be lowered. However, reducing backlight brightness may decrease the quality of the displayed images.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
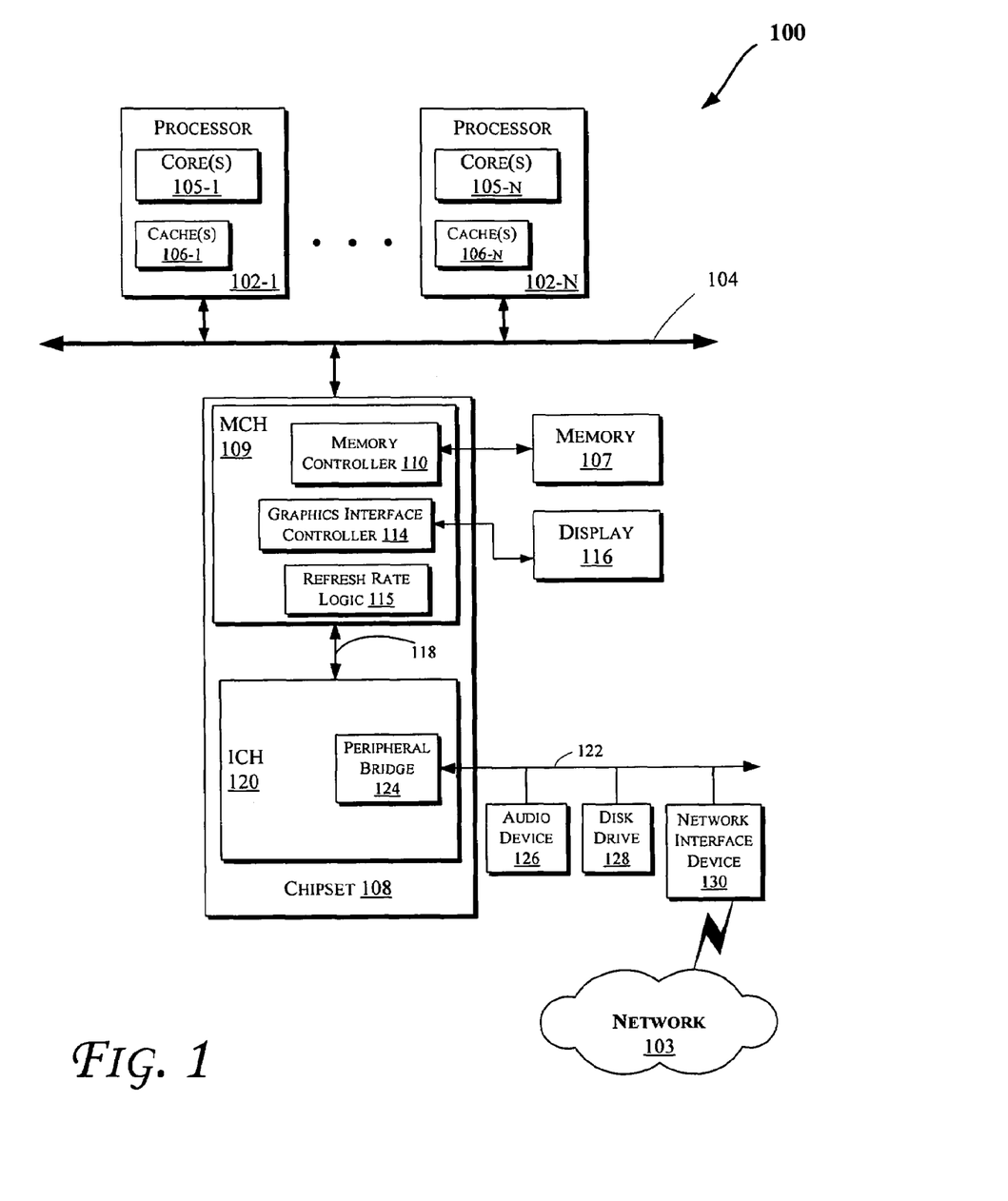
FIGS. 1 and 5 illustrate block diagrams of embodiments of computing systems, which may be utilized to implement various embodiments discussed herein.

Some of the embodiments discussed herein may provide efficient mechanisms for adjusting power consumption of display devices (such as LCDs or flat panel displays). In an embodiment, the refresh rate of display devices may be modified to reduce power consumption, for example, without producing image artifacts or glitches that may be visible to an unaided human eye. Furthermore, some of the embodiments discussed herein may be utilized in various computing systems such as those discussed with reference to FIGS. 1-5. More particularly, FIG. 1 illustrates a block diagram of a computing system 100 in accordance with an embodiment of the invention. The computing system 100 may include one or more central processing unit(s) (CPUs) or processors 102-1 through 102-N (collectively referred to here in as "processor 102" or "processors 102") that communicate via an interconnection network (or bus) 104. The processors 102 may include a general purpose processor, a network processor (that processes data communicated over a computer network 103), or other types of a processor (including a reduced instruction set computer (RISC) processor or a complex instruction set computer (CISC)).

Moreover, the processors 102 may have a single or multiple core design, e.g., one or more of the processors 102 may include one or more processor cores 105-1 through 105-N (collectively referred to here in as "core 105" or "cores 105"). The processors 102 with a multiple core design may integrate different types of processor cores 105 on the same integrated circuit (IC) die. Also, the processors 102 with a multiple core design may be implemented as symmetrical or asymmetrical multiprocessors.

In an embodiment, one or more of the processors 102 may include one or more caches 106-1 through 106-N (collectively referred to here in as "cache 106" or "caches 106"). The cache 106 may be shared (e.g., by one or more of the cores 105) or private (such as a level 1 (L1) cache). Moreover, the cache 106 may store data (e.g., including instructions) that are utilized by one or more components of the processors 102, such as the cores 105. For example, the cache 106 may locally cache data stored in a memory 107 for faster access by components of the processor 102. In an embodiment, the cache 106 (that may be shared) may include a mid-level cache and/or a last level cache (LLC). Various components of the processors 102 may communicate with the cache 106 directly, through a bus or interconnection network, and/or a memory controller or hub.

A chipset 108 may also communicate with the interconnection network 104. The chipset 108 may include a graphics and memory control hub (GMCH) 109 which is more generally referred to herein as a memory control hub (MCH) 109 herein. The MCH 109 may include a memory controller 110 that communicates with the memory 107. The memory 107 may store data, including sequences of instructions that are executed by the processors 102, or any other device included in the computing system 100. In one embodiment of the invention, the memory 107 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 104, such as multiple system memories.

The MCH 109 may also include a graphics interface controller 114 and a refresh rate logic 115. As will be further discussed herein, e.g., with reference to FIGS. 2-4, the logic 115 may cause the switching of the refresh rate of a display device 116. The graphics interface controller 114 may communicate with the display device 116, e.g., to display one or more image frames corresponding to data stored in the memory 107. The display device 116 may be any type of a display device, such as a flat panel display (including an LCD, a field emission display (FED), or a plasma display) or a display device with a cathode ray tube (CRT). In one embodiment of the invention, the graphics interface controller 114 may communicate with the display device 116 via a low voltage differential signal (LVDS) interface, a digital video interface (DVI), or a high definition multimedia interface (HDMI). Also, the display device 116 may communicate with the graphics interface controller 114 through, for example, a signal converter that translates a digital representation of an image stored in a storage device such as video memory or system memory (e.g., memory 107) into display signals that are interpreted and displayed by the display device 116.

A hub interface 118 may allow the MCH 109 and an input/output control hub (ICH) 120 to communicate. The ICH 120 may provide an interface to I/O devices that communicate with the computing system 100. The ICH 120 may communicate with a bus 122 through a peripheral bridge (or controller) 124, such as a peripheral component interconnect (PCI) bridge, a universal serial bus (USB) controller, or other types of peripheral bridges or controllers. The bridge 124 may provide a data path between the CPU 102 and peripheral devices. Other types of topologies may be utilized. Also, multiple buses may communicate with the ICH 120, e.g., through multiple bridges or controllers. Moreover, other peripherals in communication with the ICH 120 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 122 may communicate with an audio device 126, one or more disk drive(s) 128, and a network interface device 130 (which is in communication with the computer network 103). Other devices may communicate via the bus 122. Also, various components (such as the network interface device 130) may communicate with the MCH 109 in some embodiments of the invention. In addition, the processor 102 and the MCH 109 may be combined to form a single chip. Furthermore, the graphics controller 114 and/or logic 115 may be included within the display device 116 in other embodiments of the invention.

Furthermore, the computing system 100 may include volatile and/or nonvolatile memory (or storage). For example, nonvolatile memory may include one or more of the following: read-only memory (ROM), programmable ROM (PROM), erasable PROM (EPROM), electrically erasable EPROM (EEPROM), a disk drive (e.g., disk drive 128), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 2:
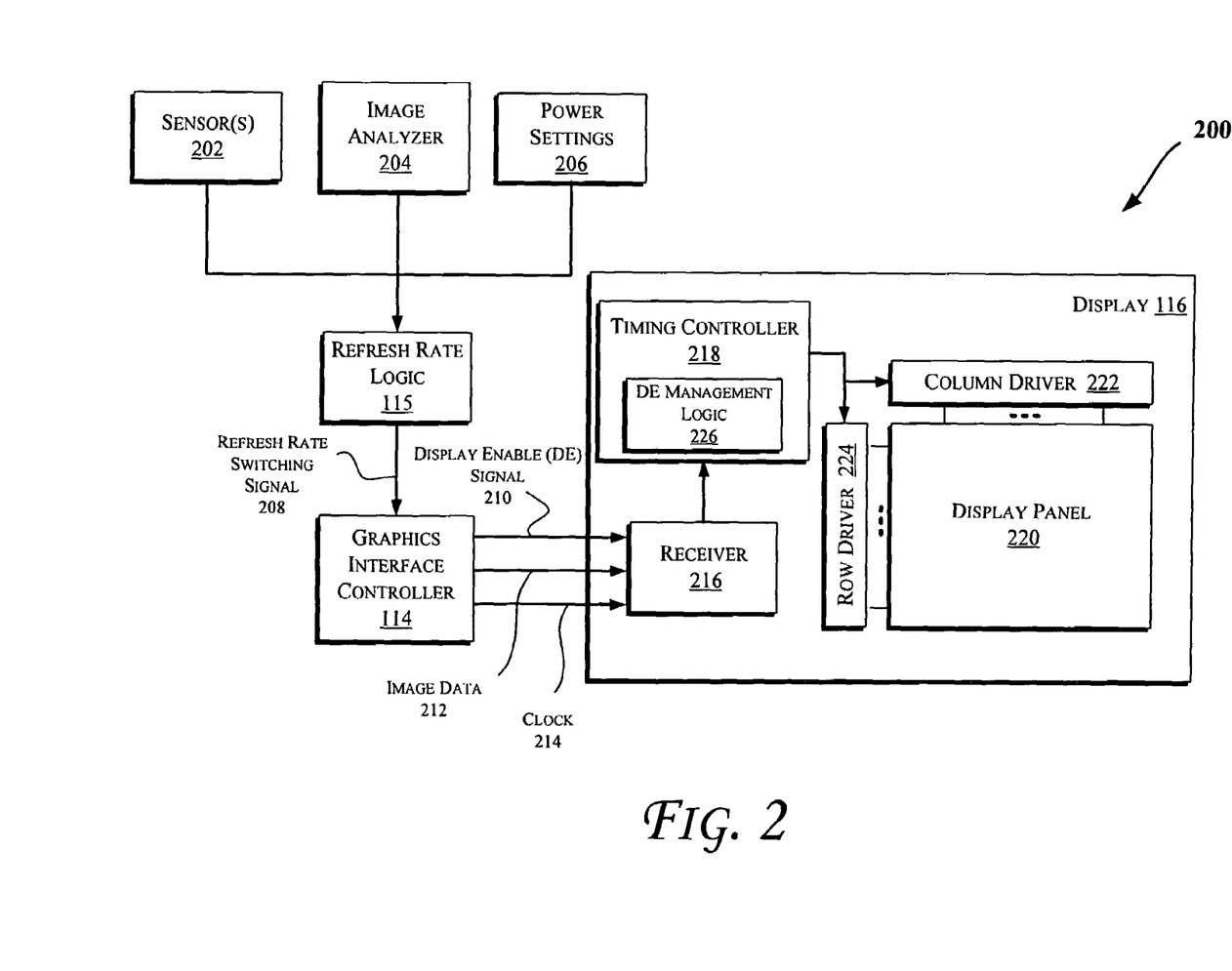
FIG. 2 illustrates a block diagram of portions of a display system, according to an embodiment of the invention.

FIG. 2 illustrates a block diagram of portions of a display system 200, according to an embodiment of the invention. As shown in FIG. 2, the system 200 may include the graphics interface controller 114, the refresh rate logic 115, and the display device 116.

The logic 115 may receive signals from one or more sensors 202. In an embodiment, one or more sensors 202 may be provided proximate to various components of the computing system 100 of FIG. 1. Each of the sensors 202 may generate a signal to indicate a corresponding temperature value of the component to which the respective sensor 202 is proximate. The logic 115 may also receive one or more signals from an image analyzer logic 204 which may analyze data corresponding to one or more image frames, e.g., to detect motion and/or determine image content. The logic 115 may further receive one or more signals corresponding to one or more power settings 206, which may be stored in a storage device such as those discussed with reference to FIG. 1. In an embodiment, the power settings 206 may be provided: by a power management policy; based on information derived from monitoring system power states (or processor or system component activity); by a user; in accordance with current system power states or settings; based on the current power source (such as an alternating current (AC) power source or a direct current (DC) power source (e.g., a battery)); otherwise predefined; or combinations thereof. Additionally, the logic 115 may receive one or more signals (not shown) that are generated in response to a selected refresh rate which may correspond to a value stored in a storage device such as those discussed with reference to FIG. 1. Moreover, the selected refresh rate may be provided by an instruction (that may correspond to a software application or software program) executing on one of the cores 105 of FIG. 1.

Figure 3:
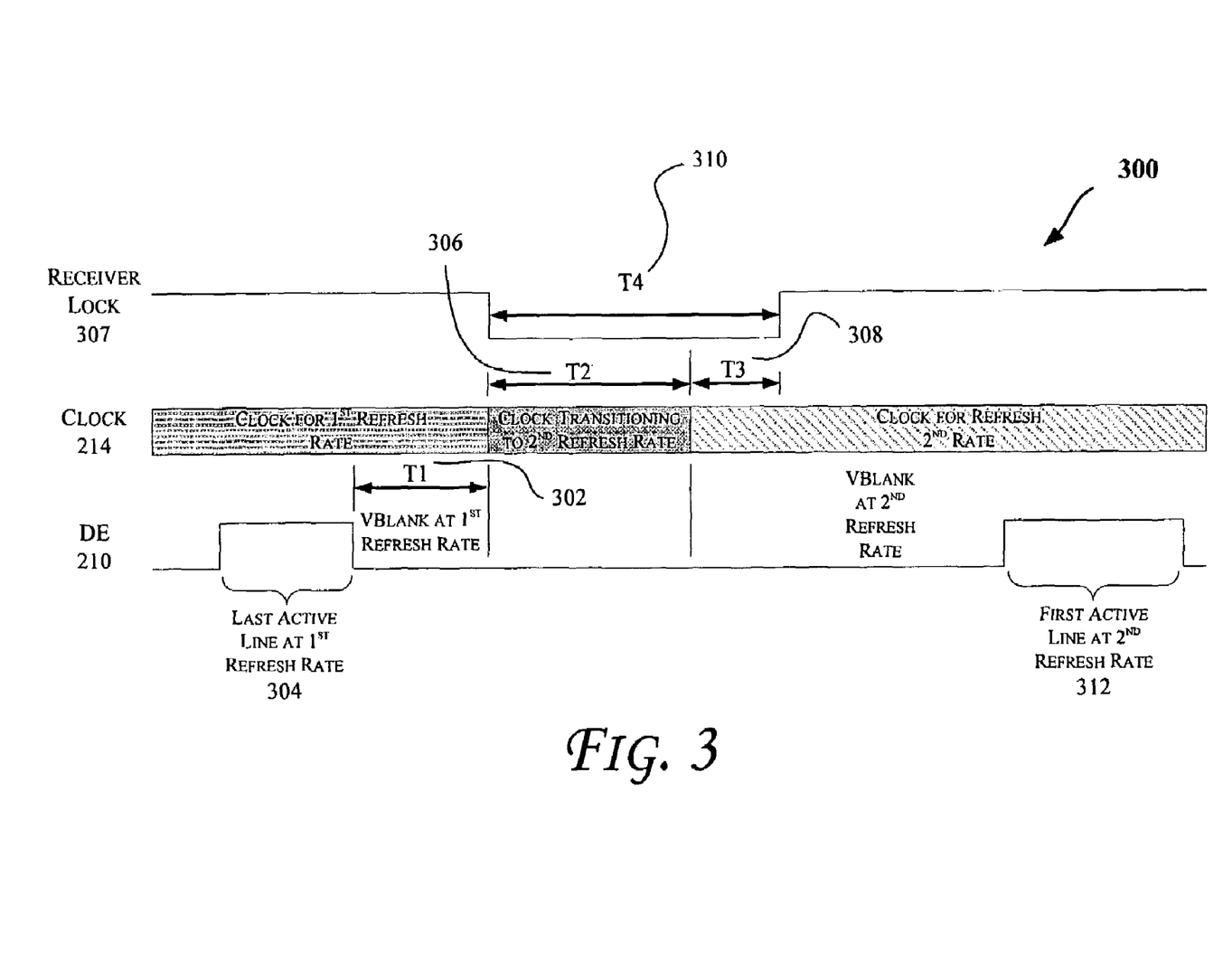
FIG. 3 illustrates a timing diagram in accordance with an embodiment of the invention.
Figure 4:
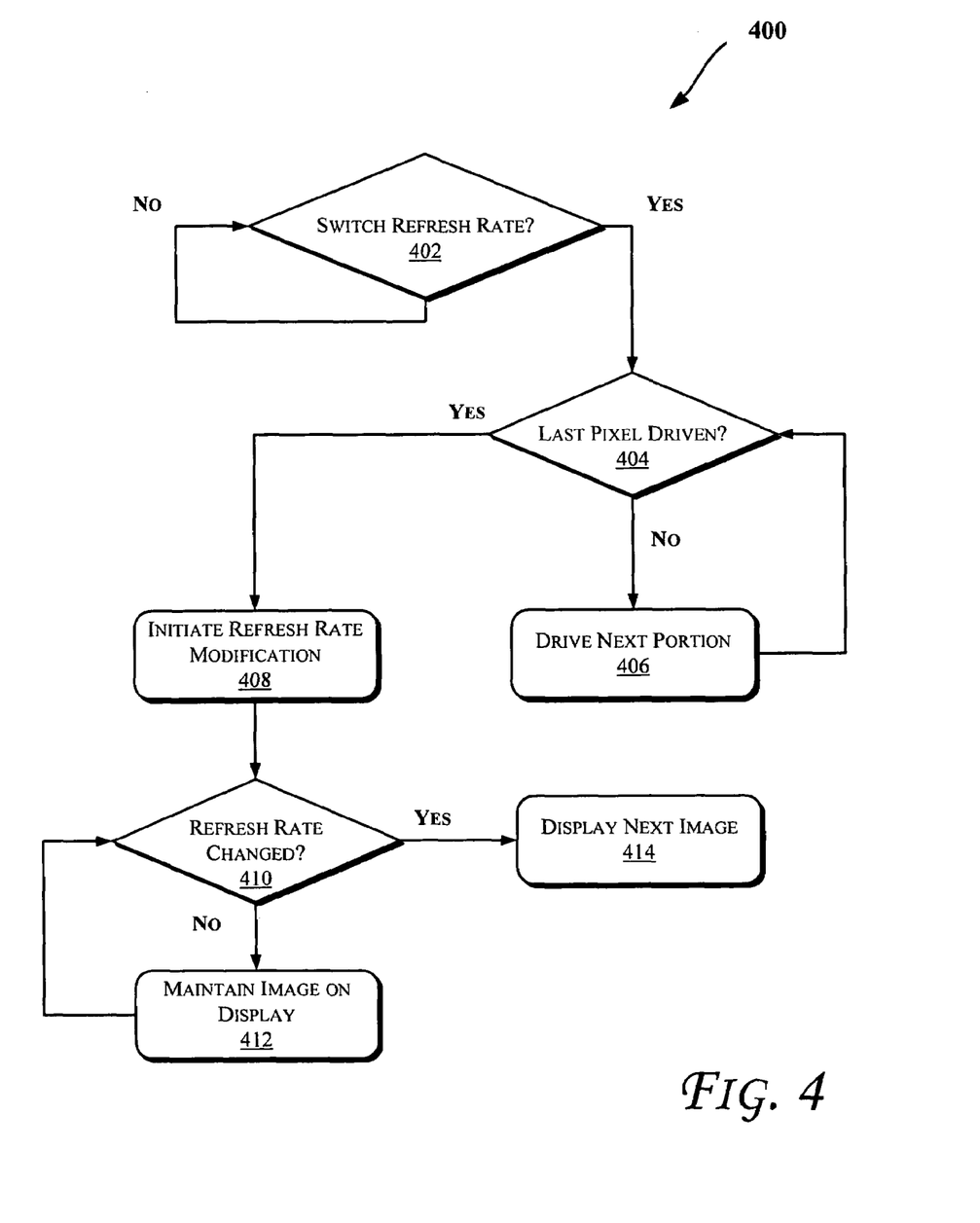
FIG. 4 illustrates a flow diagram of an embodiment of a method to modify the refresh rate of a display device, according to an embodiment.

As will be further discussed herein, e.g., with reference to FIGS. 3 and 4, the logic 115 may generate a refresh rate switching signal 208 (for example, based on the signals received from sensor(s) 202, image analyzer 204, power settings 206, a selected refresh rate, or any combination thereof) to indicate to the graphics interface controller 114 that the refresh rate of the display device 116 is to be modified. The refresh rate of the display device 116 may be increased to improve performance and/or decreased to reduce power consumption by the display device 116 and potentially any corresponding circuitry (such as the memory 107 that may store data corresponding to images displayed on the display device 116).

For example, in an embodiment, if the sensors 202 indicate a temperature value that is higher than a threshold temperature, the logic 115 may indicate to the controller 114 that the refresh rate of the display device 116 is to be reduced to reduce power consumption and, hence, to reduce the heat generated by the display device 116 and any corresponding circuitry. Also, if the image analyzer logic 204 indicates that the motion present between various image frames is above a threshold value, the logic 115 may indicate to the controller 114 that the refresh rate of the display device 116 is to be increased to reduce any artifacts that may be visible to an unaided human eye. Further, if the logic 115 may indicate to the controller 114 that the refresh rate of the display device 116 is to be decreased or increased in accordance with various settings 206.

As illustrated in FIG. 2, the controller 114 may provide a display enable (DE) signal 210 (e.g., which may indicate when valid image data is present), image data signal(s) 212 (e.g., which may correspond to image data that is to be reproduced by the display device 116 for viewing by a user), and a clock 214 (e.g., to synchronize signals) to a receiver 216. The image data 212 may be progressive or interlaced in various embodiments. Also, the image data 212 may be provided in accordance with a low voltage differential signal (LVDS) interface, in an embodiment. Further details regarding signals 210, 212, and 214 will be further discussed with reference to FIG. 3 in accordance with an embodiment.

In an embodiment, the receiver 216 may provide the DE signal 210 and the image data 212 to a timing controller (TCON) 218. The timing controller 218 may drive the display panel 220 in accordance with the image data 212 and DE signal 210, e.g., through the column driver 222 and row driver 224. The display device 116 may also include a DE management logic 226 to cause the DE signal 210 to be ignored or disregarded (e.g., internally to the display device 116 and independent of the signal provided by the controller 114) after the display device 116 loses a lock of a incoming image signal (such as the clock signal 214 and/or image data signal 212). This may allow the display panel 220 to continue displaying the previous image until a new image is available for displaying. In an embodiment, the controller 218 may drive a plurality of pixels of the display panel 220 to the same level (e.g., providing a blank display) if the display device 116 fails to lock onto an incoming image signal (such as the clock signal 214 and/or image data signal 212) prior to expiration of a specified time period that follows the previously displayed image frame. As shown in FIG. 2, the logic 226 may be provided in the controller 218 in an embodiment. Alternatively, the logic 226 may be provided elsewhere in the system 200. Also, in accordance with one embodiment, one or more of the components 202, 204, 206, 114, and/or 115 may be provided within the display device 116.

FIG. 3 illustrates a timing diagram 300 in accordance with an embodiment of the invention. Referring to FIGS. 2 and 3, the clock 214 may switch from a first refresh rate to a second refresh rate after a minimum delay T1 (302) from the start of a vertical blank. The vertical blank after the first refresh may start after the last active line (304) as indicated by the DE signal 210. After a maximum delay T2 (306), the clock 214 may complete the transition to a new frequency in accordance with the refresh rate switching signal 208. As illustrated in FIG. 3, the receiver 216 may acquire a lock (307) on the second clock rate after a maximum delay T3 (308). As discussed with reference to FIG. 2, the DE management logic 226 may cause the DE signal 212 to be ignored or disregarded for a maximum period of T4 (310), e.g., which may be equal to the sum of periods T2 (306) and T3 (308), to allow the display device 116 to maintain the previous image on the display panel 220. In an embodiment, the controller 218 may drive a plurality of pixels of the display panel 220 to the same level (e.g., providing a blank display) if the display 116 fails to lock (307) onto an incoming image signal (e.g., clock signal 214 and/or image data signal 212) prior to the end of period T4 (310) (or T3 (308)) that follows a delay of period T1 (302) from the previously displayed image frame (e.g., following the last active line of the previous image 304). Otherwise, first active line of the next image 312 may be successfully displayed in accordance with the second refresh rate of the clock 214 after the receiver 216 successfully acquires a lock of the second clock rate during period T4 (310) (or at least prior to the occurrence of the first active line 312).

FIG. 4 illustrates a flow diagram of an embodiment of a method 400 to modify the refresh rate of a display device, according to an embodiment of the invention. In an embodiment, various components discussed with reference to FIGS. 1-3 and 5 may be utilized to perform one or more of the operations discussed with reference to FIG. 4. For example, the method 400 may be used to modify the refresh rate of the display device 116 in accordance with the refresh rate switching signal 208 generated by the logic 115 of FIGS. 1-2.

Referring to FIGS. 1-4, at an operation 402, the logic 115 may determine whether the refresh rate of the display device 116 is to be modified such as discussed with reference to FIGS. 2 and 3. Once the logic 115 determines that the refresh rate of the display device 116 is to be modified, the logic 115 may generate the signal 208 to indicate to the controller 114 that the refresh rate of the display device 116 is to be modified. At an operation 404, the controller 218 may determine whether the last pixel of a portion of the display panel 220 has been driven, e.g., indicating the start of a horizontal blank period (e.g., which may be present between intermediate lines of image data displayed on the display panel 220) or a vertical blank period (e.g., which may be present between the last line of a previous image frame and the first line of the next image frame such as discussed with reference to FIG. 3). If the last pixel has not been driven, the controller 218 drives the next portion of the display panel 220 (which may be a line of the panel 220 in an embodiment).

After the last pixel has been driven as determined by operation 404, the controller 114 may initiate the refresh rate modification at operation 408 (e.g., after the period T1 (302) discussed with reference to FIG. 3 in accordance with an embodiment). For example, such as discussed with reference to FIG. 3, the refresh rate modification may be initiated during the vertical blank period that follows the last active line of the previous image frame. Alternatively, the refresh rate modification may be initiated during the horizontal blank period.

In an embodiment, as long as the refresh rate has not been changed (410), e.g., while the clock 214 is transitioning (e.g., during period T2 (306)), the same image (or a blank screen) may be maintained on the display panel 220 (412), such as discussed with reference to FIG. 2. At operation 414, the controller 218 may display the next image in accordance with the new refresh rate (e.g., as indicated by the clock 214). Accordingly, in an embodiment, the panel 220 may display (or freeze) the same image until the receiver 216 is able to lock onto the new frequency of the clock 214. In one embodiment, the refresh rate of display devices (116) may be modified to reduce power consumption or increase performance, for example, without producing image artifacts or glitches that may be visible to an unaided human eye.

Figure 5:
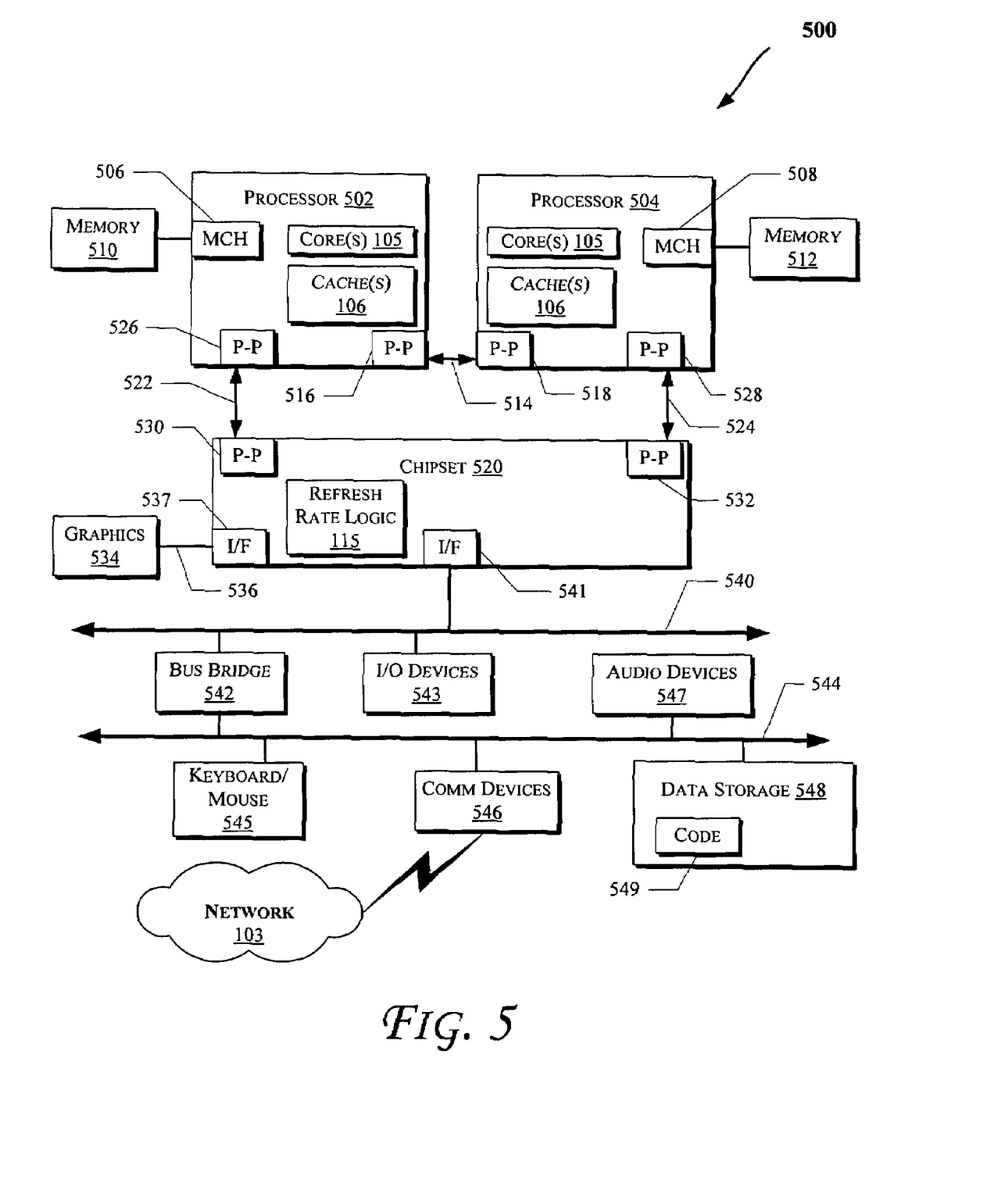

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 107 of FIG. 1.

In an embodiment, the processors 502 and 504 may be one of the processors 102 discussed with reference to FIG. 1. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. In an embodiment, the logic 115 may be provided in the chipset 520. Also, one or more of the cores 105 and/or caches 106 of FIG. 1 may be located within the processors 502 and 504. Other embodiments of the invention may exist in other circuits, logic units, or devices within the system 500. Furthermore, other embodiments of the invention may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 543 may communicate with other devices such as a keyboard/mouse 545, communication devices 546 (such as modems, network interface devices, or other communication devices that may communicate with the computer network 103), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein.

Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a first logic to generate a signal to switch a refresh rate of a display;
   a second logic to cause the display to switch from a first refresh rate to a second refresh rate in response to the generated signal and after a last pixel of a portion of the display is driven; and
   a third logic to cause a display enable signal to be disregarded after the display loses a lock of an incoming image signal.

2. The apparatus of claim 1, further comprising a third logic to maintain an image on the display while the display transitions from the first refresh rate to the second refresh rate.

3. The apparatus of claim 1, wherein the portion of the display comprises an intermediate line of the display or a last line of the display.

4. The apparatus of claim 1, wherein the second logic causes the display to switch from the first refresh rate to the second refresh rate during one of: a vertical blank period or a horizontal blank period.

5. The apparatus of claim 1, wherein the first logic generates the signal based on one or more of: a sensed temperature value, analysis of image data corresponding to one or more frames, a selected refresh rate, or a power setting.

6. The apparatus of claim 1, further comprising a third logic to drive a plurality of pixels of the display to a same level if the display fails to lock onto an incoming image signal prior to a start of a next image frame.

7. The apparatus of claim 1, wherein the display comprises a liquid crystal display, a plasma display, a field emission display, or a cathode ray tube.

8. The apparatus of claim 1, further comprising a memory to store data corresponding to one or more image frames that are displayed on the display.

9. A method of managing a refresh rate of a display comprising:
   determining an occurrence of a blank period after displaying a portion of a first image frame;
   initiating a display refresh rate modification during the blank period; and
   disregarding a display enable signal after a display loses a lock of an incoming image signal.

10. The method of claim 9, further comprising maintaining an image on the display during the display refresh rate modification.

11. The method of claim 9, further comprising driving a plurality of pixels of the display to a same level if the display fails to lock onto the incoming image signal prior to a specified time period that follows the first image frame.

12. The method of claim 9, wherein the blank period occurs between a first line of the first image frame and a second line of the first image frame.

13. The method of claim 9, wherein the blank period occurs between the first image frame and a second image frame, the second image frame to follow the first image frame.

14. The method of claim 9, wherein initiating the display refresh rate modification is performed based on one or more of: a sensed temperature value, analysis of image data corresponding to one or more frames, a selected refresh rate, or a power setting.

15. The method of claim 9, further comprising storing data corresponding to the first image frame in a memory.

16. A system comprising:
   a flat panel display device to display a first image frame and a second image frame; and
   a graphics interface controller to cause the flat panel display device to display:
      the first image frame in accordance with a first refresh rate; and
      the second image frame in accordance with a second refresh rate, wherein the graphics interface controller is to cause a display enable signal to be disregarded after the display device loses a lock of an incoming image signal.

17. The system of claim 16, wherein the flat panel display device comprises a liquid crystal display (LCD) device.

18. The system of claim 16, further comprising a memory to store data corresponding to the first image frame and the second image frame.

19. The system of claim 18, further comprising a plurality of processor cores to access the data stored in the memory.

20. The system of claim 16, further comprising a first logic to maintain an image on the flat panel display device while the display device transitions from the first refresh rate to the second refresh rate.

21. The system of claim 16, wherein the graphics interface controller causes the flat panel display to switch from the first refresh rate to the second refresh rate during a vertical blank period that follows the first image frame.

22. The system of claim 16, further comprising a first logic to generate a signal based on one or more of: a sensed temperature value, analysis of image data corresponding to one or more frames, a selected refresh rate, or a power setting, wherein the graphics interface controller causes the flat panel display device to switch from the first refresh rate to the second refresh rate based on the generated signal.

23. A display device comprising:
a display panel to display a first image frame and a second image frame; and
a graphics interface controller to cause the display panel to display:
the first image frame in accordance with a first refresh rate; and
the second image frame in accordance with a second refresh rate, wherein the graphics interface controller is to cause a display enable signal to be disregarded after the display panel loses a lock of an incoming image signal.

24. The display device of claim 23, wherein the display panel comprises a liquid crystal display (LCD) device.

25. The display device of claim 23, wherein the graphics interface controller causes the display panel to switch from the first refresh rate to the second refresh rate during a vertical blank period that follows the first image frame.

26. A computing system comprising:
a first logic to generate a signal to switch a refresh rate of a display;
a graphics interface controller to cause the display to switch from a first refresh rate to a second refresh rate in response to the generated signal and after an occurrence of a blank period; and
a second logic to cause a display enable signal to be disregarded after the display loses a lock of an incoming image signal.

27. The computing system of claim 26, further comprising a third logic to maintain an image on the display while the display transitions from the first refresh rate to the second refresh rate.

28. The computing system of claim 26, wherein the first logic generates the signal based on one or more of: a sensed temperature value, analysis of image data corresponding to one or more frames, a selected refresh rate, or a power setting.

29. An apparatus comprising:
a first logic to generate a signal to switch a refresh rate of a display;
a second logic to cause the display to switch from a first refresh rate to a second refresh rate in response to the generated signal and after a last pixel of a portion of the display is driven; and
a third logic to drive a plurality of pixels of the display to a same level if the display fails to lock onto an incoming image signal prior to a start of a next image frame.

30. The apparatus of claim 29, further comprising a third logic to maintain an image on the display while the display transitions from the first refresh rate to the second refresh rate.

31. The apparatus of claim 29, wherein the portion of the display comprises an intermediate line of the display or a last line of the display.

32. The apparatus of claim 29, wherein the second logic causes the display to switch from the first refresh rate to the second refresh rate during one of: a vertical blank period or a horizontal blank period.

33. The apparatus of claim 29, wherein the first logic generates the signal based on one or more of: a sensed temperature value, analysis of image data corresponding to one or more frames, a selected refresh rate, or a power setting.

34. The apparatus of claim 29, further comprising a third logic to cause a display enable signal to be disregarded after the display loses a lock of an incoming image signal.

35. The apparatus of claim 29, wherein the display comprises a liquid crystal display, a plasma display, a field emission display, or a cathode ray tube.

36. The apparatus of claim 29, further comprising a memory to store data corresponding to one or more image frames that are displayed on the display.

* * * * *